United States Patent [19]

Lynn

[11] 3,864,500
[45] Feb. 4, 1975

[54] PROCESS OF PREPARING AN EGG YOLK SUBSTITUTE AND RESULTING PRODUCTS FROM ITS USE

[76] Inventor: Charles C. Lynn, 102-30 66th Rd., Forest Hills, N.Y. 11375

[22] Filed: July 23, 1973

[21] Appl. No.: 381,416

Related U.S. Application Data

[63] Continuation-in-part of Ser. No. 144,328, May 17, 1971, abandoned.

[52] U.S. Cl. ............... 426/195, 426/199, 426/201, 426/363
[51] Int. Cl. .............................................. A23j 3/02
[58] Field of Search ............ 426/199, 189, 194, 195, 426/342, 348, 211, 363, 153, 509, 195, 163, 205, 362, 364, 373, 377, 509

[56] References Cited
UNITED STATES PATENTS

| | | | |
|---|---|---|---|
| 2,739,898 | 3/1956 | Kumetat | 426/271 |
| 3,640,732 | 2/1972 | Johnson | 426/167 |
| 3,697,290 | 10/1972 | Lynn | 426/153 |

Primary Examiner—Raymond N. Jones
Assistant Examiner—R. A. Yoncoskie

[57] ABSTRACT

An egg yolk substitute is prepared by combining non-elastic protein material, oil and salt and heating at a low simmering temperature, adding a mild acid to the foregoing and continuing heating for a period of time sufficient to bring out flavor characteristics, adding water and vegetables and boiling, adding additional water and non-elastic protein material, continuing boiling, adding a thickening agent, continuing boiling and then drying to obtain a material of high protein content. This high protein content material is blended with a food grade emulsifier and optionally with appearance and texturizing agents and a neutralizer and optionally a milk derivative protein to form the egg yolk substitute. Depending on the application, the egg yolk substitute may be used alone or in combination with egg yolks as a functional egg yolk replacer which is characterized by (1) high protein content substantially the same as eggs, based on Kjeldahl nitrogen tests, (2) low cholesterol and fat content, (3) the combination provides similarity in taste and appearance to egg yolks, (4) long shelf-life in its dry form, and (5) economy.

27 Claims, No Drawings

PROCESS OF PREPARING AN EGG YOLK SUBSTITUTE AND RESULTING PRODUCTS FROM ITS USE

CROSS-REFERENCE TO RELATED APPLICATIONS

This application is a continuation-in-part of the patent application of Charles C. Lynn entitled "Egg Substitute and Resulting Products From Its Use", Ser. No. 144,328, filed May 17, 1971, now abandoned.

The purpose of this abstract is to enable the public and the Patent Office to determine rapidly the subject matter of the technical disclosure of the application. This abstract is neither intended to define the invention of the application nor is it intended to be limiting as to the scope thereof.

BACKGROUND OF THE INVENTION

1. Field of the Invention

The invention relates to the preparation of a high protein egg yolk substitute that, depending on the application, may be used either alone or with egg yolks to replace egg yolks.

2. Description of the Prior Art

The presently known substitutes for egg yolks are not in reality substitutes but rather extenders. These extenders are much more limited in application and in the amount which can be used and have only the advantage of lowering the cost of egg yolks. They have little or no protein content. Therefore, the addition of the extenders reduces substantially the nutritional properties. In a number of cases, these additives do not provides any egg yolk functionality other than possibly a slight increase in emulsification properties due to the presence of an emulsifier. The extenders also provide some liquid absorption properties. Typical of these materials are gums, starches, mono- and di-sacharides. A typical extended egg yolk formulation consists of 80% egg yolk, 18½% corn syrup solids, 1% vegetable gum and ½% lecithin. Basically, the extender adds sweeteners and starch to the product while reducing the protein content by one-fifth. The use of the egg yolk extenders has come about mainly because of cost considerations.

Dried eggs are used because they have a longer shelf-life than whole eggs. Dried eggs in sufficient quantity (above 4.5% on a dry weight basis) tend to react with the other materials in a dry cake mix causing spoilage and taste changes. Commercial mixes seldom contain large quantities of dried eggs for this reason as well as for economical reasons. The instructions to bakers urge the addition of whole eggs when a richer cake is desired.

SUMMARY OF THE INVENTION

An object of the invention is to provide an improved egg yolk substitute.

Another object is to provide an egg yolk replacer characterized by high protein content substantially the same as eggs, based on Kjeldahl nitrogen tests, low cholesterol and fat content, similarity in taste and appearance to egg yolks, long shelf-life in its dry form and economy.

The foregoing and other objects of the invention are accomplished by combining a non-elastic protein material, oil and salt and heating at a low simmering temperature, adding a mild acid to the foregoing and continuing heating for a period of time sufficient to bring out flavor characteristics, adding water and vegetables and boiling, adding additional water and non-elastic protein material and continuing boiling, adding a thickening agent, continuing boiling and then drying to obtain a material of high protein content. The process for preparing this high protein content material is described with more particularity in a patent of Charles C. Lynn entitled "High Protein Edible Product and Method of Preparing Same," Ser. No. 879,717 filed Nov. 25, 1969, now U.S. Pat. No. 3,697,290, issued Oct. 10, 1972, and is incorporated herein by reference. This high protein content material is blended with a food grade emulsifier and optionally appearance and texturizing agents, a neutralizer and, optionally, a mild derivative protein to form an egg yolk substitute. Depending on the application, the egg yolk substitute may be used alone or in combination with egg yolks as a functional egg yolk replacer which is characterized by (1) high protein content substantially the same as eggs, based on Kjeldahl nitrogen tests, (2) low cholesterol and fat content, (3) the combination provides similarity in taste and appearance to egg yolks, (4) long shelf-life in its dry form, and (5) economy.

Unless otherwise specified, the following definitions apply herein: The term "egg yolk substitute" refers to that material resulting from the addition of a food grade emulsifier and optionally appearance and texturizing agents and a neutralizer and optionally a milk derivative protein to the high protein content material as described in the Patent of Lynn, U.S. Pat. No. 3,679,290. In some instances this egg yolk substitute may be used to replace completely egg yolks, but in most applications, for optimum results, the egg yolk substitute is combined with egg yolks and optionally corn syrup solids to act as a functional egg yolk replacer. Accordingly, unless otherwise specified, the term "egg yolk replacer," as used herein, comprises the combination of the egg yolk substitute, egg yolks and optionally corn syrup solids. Finally, the term "whole egg replacer" denotes the combination of the egg yolk replacer with albumen.

As desired, and depending upon the product, dried whole eggs, dried egg albumen, dried egg yolks, liquid whole eggs, liquid egg yolks, liquid egg whites or combinations thereof may be used with the egg yolk substitute of this invention to form the egg yolk replacer or the whole egg replacer.

The whole egg replacer may be used as a complete or partial replacement for eggs in baked yeast raised cakes such as Danish, coffee cake and doughnuts. The eggs required in dried food pastas such a noodles, macaroni, spaghetti and the like may be wholely replaced with the egg yolk substitute or the egg yolk replacer or the whole egg replacer. In cookies, specialty breads made with eggs, and high ratio cakes such as layer and pound cake the eggs can be replaced totally with the whole egg replacer. These are but a few of the uses for the whole egg replacer of the present invention.

Other advantages of the whole egg replacer include its long shelf-life since it does not degrade due to oxidation at the same high rate as eggs. The whole egg replacer can be used in replacing the egg ingredient for high ratio cakes, such as a layer or pound. The housewife using a cake mix containing the whole egg replacer, depending on the formulation, can either omit adding other eggs completely when she mixes the milk or water with the dry cake mix or add only one whole egg. Further, other dry mixes, such as coffee cakes, etc. for the commercial market or the housewife, containing the whole egg replacer are possible.

Other objects and advantages of the present invention will become apparent from the following more detailed description of the invention.

DESCRIPTION OF THE PREFERRED EMBODIMENTS

In accordance with the teachings of the present invention one first forms a high protein content material. The process for preparing such a high protein content material is set forth in a patent of Charles C. Lynn entitled "High Protein Edible Products and Method of Preparing Same", Ser. No. 879,717, filed Nov. 25, 1969, now U.S. Pat. No. 3,697,290, issued Oct. 10, 1972, and is incorporated herein by reference. In the first step a non-elastic protein material oil and salt are combined and heated at a low simmering temperature. Typically, 75 lbs. of sesame flour (approximately 50% protein) are combined with ten gals. of vegetable oil made from sesame and 50 lbs. of salt and simmered at 180° to 190°F for approximately 40 to 50 minutes.

Then, additional non-elastic protein material and a mild acid are added to the foregoing and the heating continued to bring out flavor characteristics. Typically 50 lbs. of sesame flour and 4 lbs. of citric acid are added until the temperature 190°F is reached and heating continues for thirty minutes at a temperature of 190° to 200°F.

In the next step of the operation, water, vegetables and hydrogen peroxide are added. Typically, 120 gals. of cold water, 40 lbs. of potato flour and 12 lbs. of 35% hydrogen peroxide in water solution are added, the combination is brought to a boil and boiling is continued for approximately ten minutes.

After boiling the foregoing combination, additional water and non-elastic protein material are added and the entire mass is brought back to boiling and boiling is continued. Typically, 120 gals. of water are added and the combination is brought back to the boiling point. Then 120 lbs. of sesame flour, 60 lbs. of corn meal and 150 lbs. of soybean flour are added. Boiling continues for another 25 minutes.

At this point a thickening agent is added and cooking is continued. Typically 100 lbs. farina is added while boiling is continued and the heating is then discontinued.

To inhibit the propagation of mold, a suitable, acceptable amount of inhibitor conforming with the Food and Drug Administration Regulations can be added. Typically 1 lb. of potassium sorbate in warm water is added and mixed well. After the cooking stage the material is dried and the formation of the high protein content material is completed. If the high protein content material is to be used immediately after the cooling stage to form an egg yolk substitute, the drying step may be omitted.

The percentage of ingredients forming the high protein content material may be varied over a range so long as in the product achieved the protein content is between 25 and 55%, the fat content is between 5 and 15% and the carbohydrate content is between 25 to 50%.

In accordance with the teachings of the present invention in its broadest aspect, this high protein content material is mixed with a food grade emulsifier and mixtures thereof to form an egg yolk substitute. This combination has swelling and absorption properties similar to egg yolks, necessary in the formation of the cell structure in which the egg yolk substitute is to be used.

All weight percentages are based on the total weight of the egg yolk substitute, dry basis.

The emulsifiers typically mono- and diglyceride, lecithin, sorbitan monostearate, dioctyl sodium sulfosuccinate, polyoxyethylene sorbitan fatty acid esters such as polysorbate 60, etc., serve the purpose of binding the oil and water systems in the blend and add aeration qualities to the egg yolk substitute. Lecithin may be used along in some cases where aeration is not required. Preferably, however, it is used in combination with the other previously mentioned emulsifiers to increase surface tension. When used in combination with the other emulsifiers lecithin controls further aeration. An operable range for the emulsifiers including lecithin is from about 2 to 12% by weight, a preferred range of about 5 to 7% and an optimum value being about 6% by weight.

While the previously listed emulsifiers are preferred, a wide range of food grade emulsifiers can be used, such as those listed under "Emulsifiers: Whipping and Foaming Agents" on page 1013 of a book entitled *Food Chemicals Codex*, Second Edition, published by National Academy of Sciences, Washington, D.C., 1972. That list of emulsifiers is incorporated herein by reference.

The resulting egg yolk substitute may be used as a complete egg yolk replacer in yeast raised products such as sweet dough, dinner rolls, etc. The egg yolk substitute may also be combined with egg yolks to form an egg yolk replacer. The egg yolk replacer may also be mixed with egg albumen to obtain a whole egg replacer.

In accordance with specific teachings of the present invention the high protein content material may be mixed with a food grade emulsifier or mixtures thereof and optionally with appearance and texturizing agents and a neutralizer to form an egg yolk substitute.

In accordance with this specific teaching, an operable range for the food grade emulsifier, again typically mono- and diglycerides, sorbitan monostearate, dioctyl sodium sulfosuccinate, polyoxyethylene sorbitan fatty acid esters such as polysorbate 60, etc., is from about 1 to 10% by weight, a preferred range from about 1.5 to 5% with the optimum being 2%. The lecithin is included in amounts up to about 10%, a preferred range from 3 to 5%, and the optimum value being 4% of the egg yolk substitute formulation. The optimum value of the total emulsifiers is 6%, i.e. 2% of the food grade emulsifer and 4% lecithin. The emulsifier percentages are based on active ingredient content of the emulsifier composition.

A spice mix is added as an appearance agent and typically includes a wheat flour which acts as a carrier for other ingredients and spices typically carroteen, turmeric and amato which are included principally as appearance agents. Typically, the spice mix formulation is 60% wheat flour and 40% spices, but these percentages are variable, depending upon the coloring desired. An operable range for the spice mix is up to 15% by weight of the egg yolk substitute formulation, a preferred range from 5 to 7% with 6% being optimum.

The texturizing agent normally includes a seaweed extract, for example, alginate and carrageenan. They are included to aid emulsification, texture and moisture absorption in the final use area. The viscosity in the final use area such as a cake batter can be varied by varying the percentage of texturizing agent present. An operable range is up to 2% by weight of the egg yolk substitute formulation with the optimum being 1%. In the preferred embodiment, 0.5% of sodium alginate and 0.5% of carrageenan are included in the final egg yolk substitute formulation.

Frequently the egg yolk substitute of the present invention will be used in making cakes and the like which employ chemical leavening acids. When such leavening acids are to be employed it will be necessary to counter balance the acids in the substitute. Accordingly, a neutralizer, under these circumstances, is normally included in the egg yolk substitute formulation. An operable range is up to about 4%, a preferred range from about 1 to 3% with the optimum value being 2% by weight of the egg yolk substitute formulation. Bicarbonate of soda is the neutralizer most commonly employed. A neutralizer may also be included in the egg yolk substitute even for use in products which do not employ chemical leavening acids and without consequence.

In accordance with another embodiment the egg yolk substitute includes along with the high protein content material and food grade emulsifier, a milk derivative protein, sodium caseinate, and appearance and texturizing agents.

Sodium caseinate is a light weight derivative of milk which acts as a high volume protein filler and balances the textural characteristics of the egg yolk substitute.

In food products calling for egg yolks the egg yolk substitute resulting from the preceding description may be used either alone or with egg yolks, depending on the application to replace egg yolks. While for some applications the egg yolk substitute may be used alone, better results are achieved when mixed with egg yolks because of an apparent reaction which takes place between egg yolks and the egg yolk substitute such that the taste, texture, appearance and functional properties of the resulting combination more closely match those of egg yolks and over a wide range of applications.

My invention may also be used to obtain the equivalent of whole eggs in such items as pound cakes, layer cakes, etc. Egg albumen and preferably, whole egg powder can be added to obtain a whole egg substitute. Typical weight ratios are 45% egg yolk replacer, 20% albumen, balance whole egg powder.

It sometimes is desirable to obtain a half egg yolk, half whole egg substitute. Any of the egg yolk replacers described above are combined with egg yolks and whole egg powder to achieve such a substitute. A typical weight ratio is 6 parts egg yolk replacer to 2 parts egg yolk to 2 parts whole powdered egg.

The following examples are included merely to aid in the understanding of the invention, and variations may be made by one skilled in the art without departing from the spirit and scope of the invention.

EXAMPLE 1

Blend 83.0% of the high protein content material whose preparation is as described above with 5.0% food grade emulsifier such as D-7 made by Vanderbilt Co., 4.0% lecithin such as Sta-Sol lecithin concentrate made by Staley Manufacturing Co., 5.0% spice mix (wheat flour, carroteen, turmeric and amato), 0.5% sodium alginate, 0.5% carrageenan and 2.0% bicarbonate of soda.

This blend constitutes an egg yolk substitute. For general bakery and most food applications 40% by weight, of this blend is prepared with 10% corn syrup solids and 50% egg yolk solids to form an egg yolk replacer. In terms of protein content, based on Kjeldahl nitrogen tests, the egg yolk replacer is substantially the same as egg yolk. The texture of the replacer is similar to dried egg yolk.

A more economical formulation for sweet goods and certain cookies, such as wire cut, comprises 50% of the egg yolk substitute, 10% corn syrup solids and 40% egg yolk solids.

EXAMPLE 2

The egg yolk substitute from Example 1 is combined with corn syrup solids, egg yolk solids and dried egg albumen.

For general baking applications (except for eclairs and cream puffs), 28% of the egg yolk substitute is mixed with 7% corn syrup solids, and either 35% egg yolk solids and 30% dried egg albumen, or 50% dried whole egg and 15% dried egg albumen to form a whole egg replacer.

A more economical formulation for most cookies include 40% egg yolk substitute, 10% corn syrup solids and either 20% egg yolk solids and 30% dried egg albumen or 29% dried whole egg and 21% dried egg albumen.

EXAMPLE 3

85 grams of high protein content material are blended with 5 grams of a food grade emulsifier as in Example 1, 0.5 grams of Kelset (alginate), 0.5 grams of Carastay—26 (carrageenan), 2.0 grams bicarbonate of soda, 7.0 grams of a spice mix, 43 grams of albumen and 57.0 grams of egg yolk powder to form a whole egg replacer. Such a whole egg replacer when used in a typical egg batter mix such as layer cakes, pound cakes, etc. and baked is found to form a layer cake with excellent grain and texture properties.

EXAMPLE 4

85 grams of high protein content material, 7.0 grams of a spice mix, 5.0 grams of an emulsifier, 2.0 grams of bicarbonate of soda, 0.25 grams of Carastay—26 (carrageenan), 0.75 grams of Kelset (alginate), 43.0 grams albumen and 57.0 grams whole egg powder are combined to form a whole egg replacer. When mixed with a typical cake batter mix such as in Example 3 and baked it forms a layer cake of excellent overall quality.

EXAMPLE 5

80 grams of high protein content material, 5.5 grams of an emulsifier, 0.5 grams of Carastay—26 (carrageenan), 7.0 of a spice mix, 2.0 grams of bicarbonate of soda are blended, then combined with 5.0 grams of corn syrup solids, 43.0 grams of albumen and 57.0 grams of whole egg powder, to form a whole egg replacer. This whole egg replacer is added to a typical cake batter mix such as in Examples 3 and 4 and baked to form a layer cake with excellent grain and color properties.

EXAMPLE 6

Four sweet doughs were made, first using dried egg yolks, then using two different combinations of egg yolks and the egg yolks substitute of the present invention, and finally using the egg yolk substitute of the present invention without any egg yolks.

In each instance, the dough includes 480 grams of patent flour, 120 grams cake flour, 6 grams salt, 36 grams non-fat dry milk, 90 grams Durko shortening, 90 grams sugar, 45 grams compressed yeast and 350 cubic centimeters of water.

In the first dough 20 grams of egg yolks are included; in the second dough 10.6 grams of the egg yolk substitute of Example 1, 7.0 grams of egg yolk, 1.2 grams of corn syrup solids and 1.2 grams of dextrose are included; in the third dough, 12 grams of the egg yolk substitute of Example 1, 6 grams of egg yolks, and 2 grams of corn syrup solids are included; and, in the fourth dough, 20 grams of the egg yolk substitute of Example 1 are included.

In each instance the dough was proofed, made into twists, put into pans, proofed again for a half hour and then baked in a 400° oven. No appreciable differences were detected among the four samples.

EXAMPLE 7

Three cake batters are formed, first using whole egg solids, then using a commercially available whole egg replacer and finally using the whole egg replacer of the present invention.

In each instance, the batter includes 200 grams of Snow Sheen cake flour, 240 grams of sugar, 15 grams of non-fat dry milk, 6.25 grams of salt, 5.626 grams of baking powder, 10 grams of an emulsifier sold under the trade name Vanade by R. F. Vanderbilt Company of New York City, 140 grams of water, and then 100 more grams of water and 1 gram of vanilla since the battery is mixed in two stages.

In the first batter (A), 35 grams of whole egg solids are also included, while in the second batter (B), instead of whole egg solids, 10.5 grams of albumen and 24.5 grams of a commercially available product referred to as an egg replacer that comprises sodium whey protein concentrate, hydrogenated vegetable oil, propylene glycol monostearate, lecithin, artificial color and sodium sulfite as a preservative, are included. Finally, in the third batter (C), instead of whole egg solids, 35 grams of the whole egg replacer of the present invention that comprises 10 grams albumen, 12.5 grams egg yolks, 1.75 grams corn syrup salads, and 10.75 grams of the egg yolk substitute of Example 1, are included.

In each instance the batter temperature is 78° and then the batter is baked for 35 minutes at 375°. A comparative table follows.

|  | Batter A | Batter B | Batter C |
| --- | --- | --- | --- |
| batter specific gravity | .525 | .564 | .510 |
| cake weight (gms.) | 210 | 229 | 206 |
| cake volume (cm³) | 830 | 710 | 930 |
| cake specific volume (cm³/gm) | 3.95 | 3.10 | 4.59 |

The properties of the cake produced using the whole egg replacer of the present invention closely matched those of the cake wherein whole egg solids were used, whereas the cake prepared from the batter using a commercially available egg replacer lost a significant portion of its volume.

EXAMPLE 8

Blend 66% of high protein content material, described above, 18½% sodium caseinate, 6½% dextrose, 6% wheat flour, 0.5% spices (turmeric and amato), 2.5% emulsifiers (mono and diglycerides), to form an egg yolk substitute.

EXAMPLE 9

Blend 66% of high protein content material, 15% sodium caseinate, 16% corn syrup solids, 0.5% spices, 2.5 emulsifiers to form an extended egg yolk substitute.

The following examples provide applications for the egg yolk substitute.

EXAMPLE 10

To replace whole eggs in high ratio cakes: (For pound cakes, increase baking powder by 25-35 percent)

| DRIED EGG BASIS | LIQUID EGG BASIS |
| --- | --- |
| 50% egg yolk substitute of example 8 | 14% egg yolk substitute of example 8 |
| 20% dried egg albumen | 14% water |
| 30% dried whole eggs | 42% liquid egg white |
|  | 30% liquid whole eggs |

EXAMPLE 11

To replace whole eggs in high ratio cakes:

| DRIED EGG BASIS | LIQUID EGG BASIS |
| --- | --- |
| 45% egg yolk substitute of example 8 | 12% egg yolk substitute of example 8 |
| 22% dried egg albumen | 12% water |
| 33% dried whole eggs | 43% liquid egg whites |
|  | 33% liquid whole eggs |

EXAMPLE 12

To replace eggs in yeast raised cakes: (Danish, coffee cakes, etc.)

A. To replace whole eggs:

| DRIED EGG BASIS | LIQUID EGG BASIS |
| --- | --- |
| 60% egg yolk substitute of example 8 | 15% egg yolk substitute of example 8 |
| 40% dried whole eggs | 45% water |
|  | 40% liquid whole eggs |

B. To replace half whole eggs and half yolks:

| | |
| --- | --- |
| 60% egg yolk substitute of example 8 | 20% egg yolk substitute of example 8 |
| 20% dried egg yolks | 35% water |
| 20% dried whole eggs | 15% liquid egg yolks |
|  | 30% liquid whole eggs |

EXAMPLE 13

To replace eggs in yeast raised cakes: (Danish, coffee cakes, doughnuts, etc.)

A. To replace whole eggs;

| DRIED EGG BASIS | LIQUID EGG BASIS |
|---|---|
| 60% egg yolk substitute of example 8<br>40% dried whole eggs | 15% egg yolk substitute of example 8<br>45% water<br>40% liquid whole eggs |

B. To replace half whole eggs and half yolks:

| DRIED EGG BASIS | LIQUID EGG BASIS |
|---|---|
| 60% egg yolk substitute of example 8<br>20% dried egg yolks<br>20% dried whole eggs | 20% egg yolk substitute of example 8<br>35% water<br>15% liquid egg yolks<br>30% liquid egg yolks |

EXAMPLE 14

To replace egg yolks in yeast raised cakes:

| DRIED EGG BASIS | LIQUID EGG BASIS |
|---|---|
| 60% egg yolk substitute of example 8<br>30% dried egg yolks<br>10% dried whole eggs | 30% egg yolk substitute of example 8<br>20% water<br>20% liquid whole eggs<br>30% liquid egg yolks |

EXAMPLE 15

To replace egg yolks in doughnuts, dressings, breadings, etc.

| DRIED EGG BASIS | LIQUID EGG BASIS |
|---|---|
| 50% egg yolk substitute of example 8<br>50% dried egg yolks | 25% egg yolk substitute of example 8<br>50% liquid egg yolks<br>25% water |

A series of tests were conducted to demonstrate that the egg yolk replacer of the present invention is functionally equivalent to an egg yolk in formulations where yolk is a critical ingredient.

The evaluation was made on four types of baked goods, refrigerated cookies, sponge cakes, yellow layer cakes and pound cakes. These products incorporate yolks from 3.6 to 5.1 percent based on the total dry ingredients and constitute a reasonable range of yolk contents for standard type baked goods.

The approach with each product in each example was as follows:

1. Starting with an initial formulation (control 1, Examples 16 through 19) the yolk (or yolk + albumen) level was reduced in incremental amounts until there was a noticeable deterioration in quality based on standard objective and/or subjective criteria.

2. This established the lower limit of yolk content in the formulation thereby assuring if the yolk content was further reduced changes would be observed. "Critical" formulation is control 2 in the Examples.

3. The egg yolk replacer of the present invention was then substituted on an equal weight basis for the yolk in the "critical" formulation. The net effect was to reduce the actual yolk content below the yolk content in control 2. Resulting batters and finished goods were evaluated relative to the controls.

Only the pertinent ingredients are listed in Examples 16 through 19.

EXAMPLE 16

Refrigerated Cookies

| Ingredient As Percentage of Dry Ingredients | Control Test | Test No. 1 (Reduced Yolk) | Test No. 1 (Egg Yolk Replacer) |
|---|---|---|---|
| Base Mix (see below) | 94.74 | 97.37 | 94.74 |
| Dried Yolk | 3.58 | 0.95 | 0.95 |
| Dried Albumen | 1.68 | 1.68 | 1.68 |
| Egg Yolk Replacer | — | — | 2.63 |
| TOTAL | 100.00 | 100.00 | 100.00 |
| H₂O (Added to Dry Ingredients) | 18.03 | 18.03 | 18.03 |

| Base Mix Preparation | Percent | Grams |
|---|---|---|
| Brown Sugar | 17.14 | 67.8 |
| B. S. Sugar | 17.14 | 67.8 |
| Salt, F. F. | 0.71 | 2.8 |
| NFDM H.H. | 2.12 | 8.4 |
| Shtg. Creamtex (Melted) | 22.96 | 90.8 |
| Baking Soda | 0.31 | 1.4 |
| Cake Flour — Snosheen | 34.36 | 136.2 |
| Whole Dry Eggs | 5.26 | 21.0 |
| or | | |
| (Albumen) | 1.68 | 6.64 |
| (Yolk) | 3.58 | 14.13 |
| Water | 18.03 | 69.4 |

Combine dry ingredients. Sift. Add melted shortening while mixing on Hobart mixer using paddle speed no. 1 for 1 minute. Scrape, add water & vanilla. Mix 45 seconds speed no. 1. Scrape. Mix additional 15 seconds. Pour batter into refrigerated biscuit cans. Store overnight at 40°F before evaluating.

EGG YOLK REPLACER 2.10% of the yolk replacer of Example 1 plus 0.53% corn syrup solids.

EVALUATION PROCEDURE

Cut dough into ¾ inch slices. Cut each slice into 4 quarters. Place each quarter on an ungreased cookie sheet, 2 inches apart. Bake at 375°F for 11 minutes. Cool 2 minutes before removing.

EVALUATION RESULTS

| | Control Test | Test No. 1 (Reduced Yolk) | Test No. 2 (Egg Yolk Replacer) |
|---|---|---|---|
| Spread of 8 (in.) | 16 7/16 | 15 5/16 | 17 |
| Height of 8 (in.) | 3½ | 4 | 3¾ |
| Spec. Vol (cc/gm) | 1.94 | 1.62 | 1.36 |
| Spread:Height Ratio | 4.7 | 3.8 | 5.1 |

It will be noted that when the dried yolk level was reduced to 37% of the control (the difference being made up by flour) there was a significant drop in the specific volume of the cookies. In addition, there was a reduced spread and a greater height for the low yolk cookie relative to the control. This change in "profile" which was visually discernible can best be appreciated by reference to spread to height ratio shown.

In the formulation using the egg yolk replacer, the level of dried yolk was held constant at 37 percent of the level of yolk in the control. The additional dried yolk value was made up by the egg yolk replacer. Here, the resulting cookie was visually and organoleptically indistinguishable from the control. The specific volume was slightly lower and the spread to height ratio slightly increased. Neither change can be considered significant.

In Example 17 the ingredient levels used in the formulation are given in grams rather than as a percentage of the total dry ingredients. The total weight of the dry ingredients, exclusive of egg solids and/or egg yolk replacer, was held constant. The amount of water was adjusted in each experiment to compensate for absorp-

EXAMPLE 17

Sponge Cake

| Ingredient | Test 1 (Control 1) | Test 2 | Test 3 (Control 2) | Test 4 |
|---|---|---|---|---|
| Base Mix (see below) | 954.8 gms. | 954.8 gms. | 954.8 gms. | 954.8 gms. |
| Yolk | 49[2] | 24.5[3] | 36.38[2] | 18.38[3] |
| Albumen | 21[2] | 21[3] | 15.75[2] | 15.75[3] |
| Egg Yolk Replacer | — | 24.5 | — | 18.38 |
| Water 1st Stage | 280 | 280 | 227.5 | 227.5 |
| Water 2nd Stage | 200 | 200 | 200 | 200 |

| | Test 5 | Test 6 | Test 7 |
|---|---|---|---|
| Base Mix (see below) | 954.8 gms. | 954.8 gms. | 954.8 gms. |
| Yolk | 24.5[2] | 12.25[3] | 24.5 |
| Albumen | 10.5[2] | 10.50[3] | 15.75 |
| Egg Yolk Replacer | — | 12.25 | — |
| Water 1st Stage | 175 | 175 | 175(+36[1]) |
| Water 2nd Stage | 200 | 200 | 200 |

[1] 36 cc extra water for added albumen
[2] Yolk + albumen added as whole dried egg (WDE)
[3] Yolk + albumen added partly as WDE

Base Mix Preparation

| Cake Flour | 400 gms. |
|---|---|
| B. S. Sugar | 480 |
| NFDM | 30 |
| Salt | 12.5 |
| Baking Powder | 11.3 |
| Emulsifier | 20 |
| | 953.8 |

| Whole Dry egg | 70 |
|---|---|
| Water (1st Stage) | 280 cc |
| Water (2nd Stage) | 200 cc |

1. Use Hobart Model C-100 with 3 quart bowl and wire whip.
2. Place all dry ingredients in bowl with emulsifier and water for first stage and mix as follows scraping down several times:
   3 minutes 3rd speed
   4 minutes 2nd speed
3. Add 2nd stage water and mix:
   2 minutes 2nd speed
   4 minutes 1st speed
   Batter specific gravity .510 – .525
   Batter temperature — 72°F.
4. Scale 10 ounces (283 grams) into 7 inch ungreased tube pan.
5. Bake at 375°F approximately 25 minutes.
   Batter temperature — 72°F.

Evaluation Results

| Batter | Test 1 (Control 1) | Test 2 | Test 3 (Control 2) |
|---|---|---|---|
| Sp. Grav. 1st Stage | 0.65 | 0.63 | 0.79 |
| Sp. Grav. 2nd Stage | 0.54 | 0.48 | 0.53 |

| | Test 4 | Test 5 | Test 6 | Test 7 |
|---|---|---|---|---|
| Sp. Grav. 1st Stage | 0.77 | 1.05 | 1.02 | 0.83 |
| Sp. Grav. 2nd Stage | 0.51 | 0.60 | 0.56 | 0.53 |

| | Test 1 | Test 2 | Test 3 |
|---|---|---|---|
| Sp. Vol. | 4.96 | 5.01 | 4.89 |
| Grain | Close Uneven | Close Uneven | V.Sl. Open Uneven |
| Texture | Silky | V.Sl. Coarse | V.Sl. Coarse |
| Color | Creamy | Creamy | Creamy |
| Resiliance | Good | Good | Good |
| Profile* | 54,63, 58 | 58,65, 62 | 60,63, 62 |

—Continued

|  | Test 4 | Test 5 | Test 6 | Test 7 |
|---|---|---|---|---|
| Sp. Vol. | 4.68 | 3.76 | 3.43 | 4.07 |
| Grain | Sl.Open Uneven | Dense Uneven | Dense Uneven | Open Uneven |
| Texture | Coarse | Coarse | Harsh | Coarse |
| Color | Creamy | Creamy Dull | Creamy Dull | Creamy |
| Resilience | Fair-Good | Fair | Poor | Fair |
| Profile* | 55,61, 57 | 52,49, 51 | 50,42, 48 | 54,53, 53 |

*Cross sectional height — outer rim, middle, inner rim.

tion differences which occur because of the changes in egg solids content. This is also true in Examples 18 through 19.

The data in Test 5, when compared with Tests 1 & 3, clearly shows that the reduction in egg solids to 50% (25.4 gms.) of that contained in the control resulted in a significant reduction on the specific volume of the cake and deterioration of textured properties. Test 7 shows that changes similar to those in Test 5 occur at a 50% yolk reduction even while maintaining the albumen level at the 75% level. It is, therefore, clear that the formulation is sensitive to a reduction in yolk at or below the 75% level. In Test 4 the yolk was reduced to 37% of the yolk level in the control, and replaced with an equal weight of egg yolk replacer (i.e., yolk and egg yolk replacer = yolk at 75% level). This restored both volume and texture to that of Test 3 and very nearly to that of the control (Test 1).

It should also be noted that in Tests, 2, 5 and 7 the same weight of yolk was used. However, of these three only Test 2, which contained egg yolk replacer in addition to yolk, gave a cake of acceptable quality.

Since specific volume is not necessarily the only definitive criteria for quality, the textural qualities and physical appearance of the cakes in Tests 1–7 are preserved. In particular, attention is called to the "profile measurements" presented. These numbers are the cross sectional heights, in m.m., of the cakes at the outer rim, center and inner rim of the cakes (in that order from left to right) when cut in half. (Note: The cakes were baked in an angel food pan with a center hole). An obvious drop occurred in the cake prepared in Test 5, whereas in Tests 2 and 4 the cakes were comparable in symmetry to their all egg counterparts in Tests 1 and 3, respectively.

EXAMPLE 18

Yellow Layer Cake

| Ingredient | Test 1 (Control 1) | Test 2 (Control 2) | Test 3 | Test 4 |
|---|---|---|---|---|
| Base Mix | 540 gms. | 540 gms. | 540 gms. | 540 gms. |
| Yolk | 23.1 | 17.33 | 11.55 | 8.66 |
| Albumen | 9.9 | 7.43 | 4.95 | 7.43 |
| Egg Yolk Repl. | — | — | — | 8.66 |
| Water | 246 | 221 | 197 | 221 |

Base Mix Preparation

|  | Control |
|---|---|
| Granul. Sugar | 230 gms. |
| Cake Flour | 200 gms. |
| Salt | 4 gms. |
| Baking Powder | 10 gms. |
| H. R. Shortening | 80 gms. |
| N. F. D. Milk | 16 gms. |
| Dried Whole Egg | 33 gms. |
| Water | 246 cc |
|  | 540 |

1. Place all dry ingredients, including shortening into mixing bowl. Mix on slow speed on C-100 Hobart for two mins.
2. Add ⅓ of the water and mix on medium speed for 3 mins.
3. Add another ⅓ of the water and mix on medium speed for 3 minutes.
4. Add remaining water and mix on first speed for one min.
5. Pan 400 gms. in 8" pan and bake at 350°F for 35 mins.

Evaluation

|  | Test 1 (Control 1) | Test 2 (Control 2) | Test 3 | Test 4 |
|---|---|---|---|---|
| Batter Sp. Gravity | 0.98[1] | 0.99[2] | 0.98 | 0.95[2] |
| Cake — Specific Vol. (cc/gm.) | 3.12[1] | 3.55[2] | 2.72 | 3.15[2] |
| Grain | Close — Even | Open | Open | Sl.Dense |
| Texture | Good | Coarse | Coarse | Good |
| Symmetry | Rounded | Flat | Center Dip | V.Sl. Dip |

[1] Average of two
[2] Average of three

Example 18 presents the data on the evaluation of egg yolk replacer in a yellow cake formulation. The experimental design was the same as that used for the sponge cake.

Comparison of the data in Test 3 with those of Tests 1 and 2 in Example 18 again show a marked decrease in cake quality (note, specific volume and the appearance of a center dip) when the egg level was reduced to 50% of the control. Therefore, an egg level between 50 and 75% of the control appears to be critical. In Test 4 the yolk was reduced to 37% of the control. An equivalent weight of egg yolk replacer was added to the formulation. Thus, the "effective" yolk concentration was equivalent to 75% of the control, i.e., the same as Test 2.

A marked improvement in the cake quality was apparent.

EXAMPLE 19

Pound Cake

| Ingredient | Test 1 (Control 1) | Test 2 (Control 2) | Test 3 | Test 4 |
|---|---|---|---|---|
| Base Mix | 1333 | 1333 | 1333 | 1333 |
| Dried Yolks | 64.75 gms. | 55.02 gms. | 48.58 gms. | 27.51 gms. |
| Albumen | 27.75 gms. | 23.58 gms. | 20.82 gms. | 23.58 gms. |
| Egg Yolk Repl. | — | — | — | 27.51 |
| Water — | | | | |
| 1st Stage | 300 cc | 250 cc | 250 cc | 250 cc |
| 2nd Stage | 244 cc | 244 cc | 244 cc | 244 cc |

Base Mix Preparation

| Base Mix (1333 gms.) | |
|---|---|
| Cake Flour | 360 gms. |
| Patent Flour | 160 gms. |
| Sugar | 520 |
| Baking Powder | 12.5 |
| Salt | 14.1 |
| HH NFDM | 60 |
| Emulsified Shortening (D-21) | 200 |
| Emulsifier | 6 |
| Whole Egg Solids* | 92.5 |
| Water (1st Stage) | 300 cc |

Pound Cake

| Ingredient | Test 1 (Control 1) | Test 2 (Control 2) | Test 3 | Test 4 |
|---|---|---|---|---|
| (2nd Stage) | 244 cc | | | |

*92.5 gms. whole egg solids — 64.75 gms. yolks
24.75 gms. albumen

1. Use Hobart Mmodl C-100 with 3 quart bowl and paddle.
2. Place all dry ingredients plus shortening and emulsifier in bowl. Add 1st stage water and mix for 1 minute 1st speed and 5 minutes 3rd speed.
3. Add 2nd stage water and mix for 3 minutes on 1st speed, and 2 minutes on 2nd speed. Scrape bowl several times during both stages.
4. Scale 48 to 54 ounces for 3 pound pound cake pan.
5. Bake 300°F approximately 2 hours and 30 minutes.

Evaluation

| | Test 1 (Control 1) | Test 2 (Control 2) | Test 3 | Test 4 |
|---|---|---|---|---|
| Sp. Gravity (Batter) | .83 | .88 | .86 | .88 |
| Sp. Vol. (Cake) | 2.33 | 2.33 | 2.31 | 2.45 |
| Grain | Close | Close | Close | Close |
| Texture | Good | Good | Good | Good |
| Symmetry | Good | Good | Crown Collapsed | Good |

Tests 1, 2 and 3 show that the formulation was sensitive to a reduction in egg level between the 85 and 75% level. This was manifest by a collapse of the cake in Test 3. However, when the egg solids was reduced to 42.5% of the control and replaced by the egg yolk replaacer there was complete restoration of the cake quality. (Note that the sum of the egg solids and egg yolk replacer weights used in Test 4 are equivalent to 85% of the control egg solids and the data should be compared with both the control (Test 1) and Test 2.

While the invention has been particularly shown and described with reference to the preferred embodiments thereof, it will be understood by those skilled in the art that various changes and omissions can be made therein without departing from the spirit and scope of the invention.

What is claimed is:

1. The process of preparing an egg yolk substitute comprising the steps of:
   combining non-elastic protein material, oil and salt and heating at a low simmering temperature;
   adding a mild acid to the foregoing and continuing heating for a period of time sufficient to bring out flavor characteristics;
   adding water and vegatables and boiling;
   adding additional water and non-elastic protein material and continuing boiling;
   adding a thickening agent and continuing boiling to obtain a material of high protein content,
   the foregoing ingredients forming said high protein material selected in such proportions that the protein content of said material is between approximately 25 and 55 percent of said material; the fat content is between approximately 5 to 15 percent of said material and the carbohydrate content is between approximately 25 and 50 percent of said material; and,
   adding to the high protein content material a food grade emulsifier to form an egg yolk substitute, said food grade emulsifier comprising 1-12 percent, by weight, of said egg yolk substitute.

2. The product produced in accordance with the process of claim 1.

3. The process according to claim 1 including drying said material prior to adding said food grade emulsifier.

4. The product produced in accordance with claim 3.

5. The process according to claim 1 wherein said good grade emulsifier is selected from the group consisting of mono- and diglycerides, sorbitan monostearate, polyoxyethylene sorbitan fatty acid esters dioctyl sodium sulfosuccinate and lecithin.

6. The product produced in accordance with the process of claim 5.

7. The process according to claim 1 including adding appearance and texturizing agents to form said egg yolk substitute.

8. The process according to claim 7 including adding a milk derivative protein to said egg yolk substitute.

9. The process according to claim 7 including adding bicarbonate of soda after obtaining said high protein content material to form said egg yolk substitute.

10. The product produced in accordance with claim 9.

11. The process of claim 1 wherein the egg yolk substitute comprises, in parts, by weight

| high protein content material | 55 – 95 |
|---|---|
| food grade emulsifier | 1 – 10 (active ingredient basis) | and which further includes adding, in parts, by weight,

| | |
|---|---|
| lecithin | 0 – 10 |
| appearance agent | 0 – 15 |
| texturizing agent | 0 – 2 |
| bicarbonate of soda | 0 – 4. |

12. The process of claim 1 wherein the egg yolk substitute comprises, in parts, by weight,

| | |
|---|---|
| high protein content material | 80 – 85 |
| food grade emulsifier | 1.5 – 5 (active ingredient basis) | and which further includes adding, in parts, by weight,

| | |
|---|---|
| lecithin | 3 – 5 |
| appearance agent | 5 – 7 |
| texturizing agent | 1 – 2 |
| bicarbonate of soda | 1 – 3. |

13. The process of claim 1 wherein the egg yolk substitute comprises, in parts, by weight,

| | |
|---|---|
| high protein content material | 82 |
| food grade emulsifier | 2 (active ingredient basis) | and which further includes adding, in parts, by weight,

| | |
|---|---|
| lecithin | 4 |
| appearance agent | 6 |
| texturizing agent | 1 |
| bicarbonate of soda | 2. |

14. The process according to claim 1 including adding egg yolks to said egg yolk substitute to form an egg yolk replacer.

15. The product produced in accordance with the process of claim 14.

16. The process according to claim 14 including adding albumen to said egg yolk replacer to form a whole egg replacer.

17. The product produced in accordance with claim 16.

18. The process according to claim 1 further including adding corn syrup solids to said egg yolk substitute.

19. The product produced in accordance with the process of claim 18.

20. The process according to claim 1 including adding egg yolks and corn syrup solids to said egg yolk substitute to form an egg yolk replacer.

21. The process according to claim 20 including adding albumen to said egg yolk replacer to form a whole egg replacer.

22. The product produced in accordance with the process of claim 21.

23. The product produced in accordance with the process of claim 20.

24. The process according to claim 1 including adding albumen to said egg yolk substitute.

25. The product produced in accordance with the process of claim 24.

26. The process according to claim 1 including adding albumen and corn syrup solids to said egg yolk substitute.

27. The product produced in accordance with the process of claim 26.

* * * * *